United States Patent [19]

Byers et al.

[11] Patent Number: 4,884,596
[45] Date of Patent: Dec. 5, 1989

[54] PLUMBING FIXTURE WITH INTERIOR INSULATING AND ADHESIVE FOAM

[75] Inventors: Hugo Byers, Amherst; Tracy H. Lang, Cleveland, both of Ohio

[73] Assignee: Stanadyne, Inc., Windsor, Conn.

[21] Appl. No.: 281,638

[22] Filed: Dec. 9, 1988

[51] Int. Cl.[4] .............................................. E03C 1/02
[52] U.S. Cl. ....................... 137/801; 4/192; 137/375
[58] Field of Search .................... 4/192; 137/375, 801; 138/149

[56] References Cited

U.S. PATENT DOCUMENTS

| | | | |
|---|---|---|---|
| 287,357 | 10/1883 | Babcock | 137/375 |
| 464,689 | 12/1891 | Potter | 137/375 |
| 2,367,809 | 1/1945 | Stein et al. | 137/801 |
| 2,585,997 | 2/1952 | Bruewer | |
| 2,781,786 | 2/1957 | Young | 137/375 X |
| 3,177,528 | 4/1965 | Flower et al. | 137/375 |
| 3,367,358 | 2/1968 | Rentschler | 138/149 X |
| 3,453,716 | 7/1969 | Cook | 137/149 X |
| 3,590,876 | 7/1971 | Young | 137/801 |
| 3,638,680 | 2/1972 | Kopp | 137/801 X |
| 3,707,165 | 12/1972 | Stahl | 137/375 X |
| 3,796,380 | 3/1974 | Johnson et al. | |
| 3,871,400 | 3/1975 | Thastrup | 137/375 X |
| 3,871,406 | 3/1975 | Anderson | |
| 3,877,491 | 4/1975 | Thastrup | 137/149 |
| 4,573,769 | 4/1985 | Purcell | |
| 4,649,958 | 3/1987 | Purcell | |

Primary Examiner—Gerald A. Michalsky
Attorney, Agent, or Firm—Kinzer, Plyer, Dorn, McEachran & Jambor

[57] ABSTRACT

A plumbing fixture includes a tubular waterway and an enclosing cover. There is a space between the cover and waterway. In the method of manufacturing such plumbing fixture, a foam material consisting of a base and a catalyst therefor is positioned within the space between the cover and the waterway, with the foam material growing in the space until the space is completely filled and the waterway is secured to the cover. The foam material not only is the securing agent for the waterway and cover, but provides temperature, noise and vibration isolation therebetween.

4 Claims, 1 Drawing Sheet

U.S. Patent    Dec. 5, 1989    4,884,596
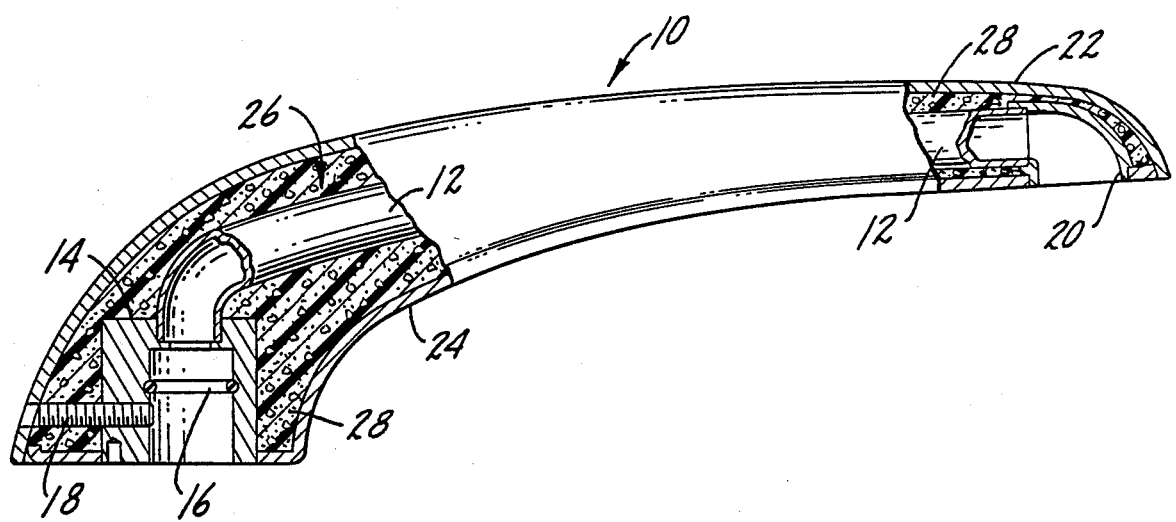

PLUMBING FIXTURE WITH INTERIOR INSULATING AND ADHESIVE FOAM

SUMMARY OF THE INVENTION

The present invention relates to plumbing fixtures and to a method of manufacture of plumbing fixtures in which a foam material is placed between a waterway and a cover, with the foam securing the waterway to the cover and providing temperature, noise and vibration isolation therebetween.

One purpose of the invention is a method of manufacturing a plumbing fixture in which the waterway is isolated from the cover by a foam material.

Another purpose is a plumbing fixture which utilizes a foam material to not only secure the parts of the fixture together, but also to isolate the waterway from the exterior cover.

Another purpose is a simply constructed, reliably operable plumbing fixture, for example a spout, which includes temperature, noise and vibration isolation material between the waterway and spout.

Another purpose is a method of assembling a plumbing fixture which utilizes no moving parts.

Other purposes will appear in the ensuing specification, drawing and claims.

BRIEF DESCRIPTION OF THE DRAWING

The invention is illustrated diagrammatically in the attached drawing which is a partial cross section through a plumbing fixture of the type disclosed herein.

DESCRIPTION OF THE PREFERRED EMBODIMENT

The present invention relates to a plumbing fixture and a method of manufacture of such fixture. The invention will be particularly described in connection with a spout, for example of the type used in a lavatory, kitchen, Roman tub or bathtub. The invention has application to other types of plumbing fixture, for example faucets, either bath or kitchen. The invention has application in any type of plumbing fixtures in which an interior waterway is to be positioned within an exterior cover or housing.

In the drawing, a Roman tub spout is indicated generally at 10 and includes an interior tubular waterway 12, for example formed of copper or plastic. At the inlet end the waterway 12 is mounted within a brass slit fit socket 14. The socket 14 may have an interior sealing O-ring 16 and a set screw 18 may be used to attach the socket and hence the spout to a water pipe which fits within the interior of the socket.

At the discharge end of waterway 12 there is a stream straightener 20 which is effective to change the direction of water flow from waterway 12 to that of a conventional spout discharge.

The exterior of spout 10 is formed by an outer shell 22 and a throat cover 24. These two members, which may be formed of metal or plastic, when joined together completely enclose the waterway 12, the socket 14, and the stream straightener 20.

Within the space or chamber 26 defined between waterway 12, the outer shell 22 and the throat cover 24 there is shown a foam material 28. The foam completely fills chamer 26, surrounding the tubular waterway, the stream straightener and the socket. The foam results from placing a given amount of a base material and a given amount of a catalyst therefor within the cavity, these two chemical elements, when combined, growing in size until the space 26 is completely filled. The foam not only fills space 26, thus providing temperature, noise and vibration isolation between the waterway and the cover, but also adhesively secures the waterway and the cover into a single integral unit.

Various types of foaming agents may be used. One which has been found to be particularly acceptable is manufactured by Olin under the trademark AUTOPOUR and uses an isocyanate as the base material and a polyol resin as the catalyst. The invention should not be limited to this particular type of foam material, as other materials, providing they perform the functions described herein, may be equally acceptable.

In the method of manufacture or assembly of the plumbing fixture described, the steps may include the placing of a predetermined amount of the base material and catalyst on the inside of either the outer shell or the throat cover, then clamping these two members over waterway 12 and permitting the assembly to sit for a few minutes while the foam grows to completely secure the elements together. The foaming agents may be placed at any location within the space between the waterway and the cover as once combined, the foam material will rapidly grow to fill the entire space therebetween.

Whereas the preferred form of the invention has been shown and described herein, it should be realized that there may be many modifications, substitutions and alterations thereto.

The embodiments of the invention in which an exclusive property or privilege is claimed are defined as follows:

1. A spout including a tubular waterway and an enclosing cover which consists of an outer shell and a throat cover, a space between said enclosing cover and said waterway, said space being filled with a foam which secures the waterway to and between both the outer shell and throat cover and secures the outer shell, throat cover and waterway into a single integral unit and provides temperature, noise and vibration insulation between the waterway and cover.

2. The plumbing fixture of claim 1 further characterized in that said spout includes a stream straightener attached to said tubular waterway at one end thereof, and a socket attached to the waterway at the other end thereof.

3. A method of assembling a
   spout having a tubular waterway and an enclosing cover which consists of an outer shell and throat cover, with a space
   being defined about the waterway and within the outer shell and throat cover, including the step of placing a given amount of a base foam material and a given amount of a catalyst therefor in the space between the waterway and enclosing cover, said base material and foam growing, in time, to completely fill the space, thereby securing the waterway to and between both the outer shell and throat cover and securing the outer shell, throat cover and waterway into a single integral unit, and providing temperature, noise and vibration insulation between the waterway and cover.

4. The method of claim 3 further characterized in that said base material is an isocyanate and said catalyst a polyol resin.

* * * * *